(12) United States Patent
De Baat

(10) Patent No.: US 6,227,468 B1
(45) Date of Patent: May 8, 2001

(54) DEVICE AND METHOD FOR LOOSENING A BLOCK OF COMPRESSED LOOSE MATERIAL, IN PARTICULAR, POTTING COMPOST

(75) Inventor: Marius Cornelis De Baat, Capelle A/D Ijssel (NL)

(73) Assignee: Logitec Plus, B.V. (NL)

( * ) Notice: Subject to any disclaimer, the term of this patent is extended or adjusted under 35 U.S.C. 154(b) by 0 days.

(21) Appl. No.: 09/330,615

(22) Filed: Jun. 11, 1999

(51) Int. Cl.⁷ .................................................. B02C 19/00
(52) U.S. Cl. .............................. 241/30; 241/200; 241/605
(58) Field of Search .................... 241/605, 200, 241/30

(56) References Cited

U.S. PATENT DOCUMENTS

| | | | |
|---|---|---|---|
| 2,646,913 | * 7/1953 | Goldberg et al. | 241/200 |
| 3,175,595 | * 3/1965 | Coutts | 241/605 |
| 4,078,733 | * 3/1978 | Popiolek | 241/200 |
| 4,360,167 | * 11/1982 | Beccalori et al. | 241/605 |
| 4,923,128 | 5/1990 | Ostrowski . | |
| 5,975,444 | * 11/1999 | Ethier | 241/605 |

FOREIGN PATENT DOCUMENTS 2371868 6/1978 (FR) .
PCTAU9300407 2/1994 (WO) .

* cited by examiner

Primary Examiner—Mark Rosenbaum
(74) Attorney, Agent, or Firm—Howard & Howard

(57) ABSTRACT

A device is disclosed for loosening a block of compressed loose material, such as potting compost, comprising a container with a plurality of support wall members for receiving the block, a scraper cooperating with one of the supporting wall members and a discharge opening. The device provides a good scraping activity and the original structure of the loose material is nearly restored.

22 Claims, 3 Drawing Sheets

DEVICE AND METHOD FOR LOOSENING A BLOCK OF COMPRESSED LOOSE MATERIAL, IN PARTICULAR, POTTING COMPOST

BACKGROUND OF THE INVENTION

The invention relates to a device for loosening a block of compressed loose material, such as potting compost, comprising a container with wall members for receiving the block, scraping means cooperating therewith and a discharge opening arranged in the container. The invention further relates to a method for using the device.

In the following specification and accompanying claims the term "loose material" means a material which normally has an incoherent structure, but which, because of its structure, can also be compressed into a coherent whole. When the loose material is compressed into a coherent whole it is referred to as "compressed loose material." Some examples of such loose material include potting compost, peat, paper, silage, straw and cotton.

Loose material is compressed into blocks of compressed loose material to reduce the cost of its packaging, transporting and processing. To subsequently process a block of compressed loose material, for instance in the case of potting compost using a machine that fills flower pots with potting compost, the block must be returned to the loose material condition such that its coherent structure is broken down. To use such machines it is necessary that the compressed loose material be returned to a fine structure or nearly the original loose material structure. Also sufficient air has to be present between the particles of the material and lumps have to be prevented.

SUMMARY OF THE INVENTION

The object of the present invention is to provide a device for loosening a block of compressed loose material, which meets the requirements mentioned above. To that end a device designed according to the present invention is characterized in that a scraper is arranged in a first supporting wall member of a container for holding the block of compressed loose material. In this way advantageous use is made of the weight of the block of compressed loose material to force the block against the scraper to ensure good scraping activity and to allow the block to lower itself downwards in constant contact with the scraper.

Preferably the scraper is moved in an upward direction along or in said first supporting wall member to also provide a conveyance function. Thus, the loosened material can be brought to one side of the device, to be received there for further handling.

To permit the device to interact with a known machine that further processes the loose material, such as a pot filling machine, the first supporting wall member having the scraper is preferably placed at an angle with respect to the horizontal. The device may also be used with the first supporting wall member set parallel to the horizontal. As a result of the inclined positioning the device has a shorter height or width, depending on the shape of the block. Furthermore the pressure of the block on the scraper can be kept limited, as a result of which the design of the scraper can be simpler. A discharge opening is arranged in the container, preferably at one end of the first supporting wall member, preferably the opening is elevated and situated at least at a height that is equal to the input opening of a further processing machine. Thus the scraper delivers the loosened material to the opening for further processing.

In one embodiment, a fixed angled arrangement of the first supporting wall member to the horizontal is used, and another block supporting wall member, which connects to the first supporting wall member containing the scraper, is pivotable between a receiving position and a supporting position for receiving the block. In this way the block can very simply be fed into the device and tilted as will be described below.

Preferably the scraper is formed by an endless belt or chain on which scraping elements are attached. For good scraping activity the scraping elements preferably are L-shaped strips.

Preferably the first supporting wall member comprises a plate below the scraping elements to prevent downward flow of scraped material. Thus, as the scraping elements are moved the scraped-off material is then shoved or taken to the discharge opening over the plate by the scraping elements.

In the discharge opening a stirring assembly is arranged to additionally shake the scraped-off material loose so that sufficient air is present between the material, lumps are crushed and the original volume is obtained again.

International patent application WO 94/03043 discloses a device for making hay or straw put together in a roll smaller, the roll being supported on a trapezium-shaped bottom in which a number of strips attached to an endless, driven chain are accommodated in order to unroll the bale of hay or straw and transport its end upwards to a separate reduction means, where the stalks are cut into pieces.

Also, U.S. Pat. No. 4,923,128 discloses a device for reducing a bale of for instance straw comprising a bale supporting wall member and a roll placed on one side thereof with a number of teeth, with which the upstanding side of the bale is pulled out. The bale is pushed to the side of the roll by means of a revolving series of angle profiles driven by means of chains.

In the method of using the device, preferably the block of compressed loose material is supplied in an upright position on a pallet, it is then put down with the pallet on an another supporting wall member for the support of the block, which wall member may or may not be open, the wall member is then tilted to let the block rest with a side surface on the first supporting wall having the scraper elements. The scraper is then activated to begin scraping the block of compressed loose material. Preferably the scraping direction is upwards toward the discharge opening, which is located above.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
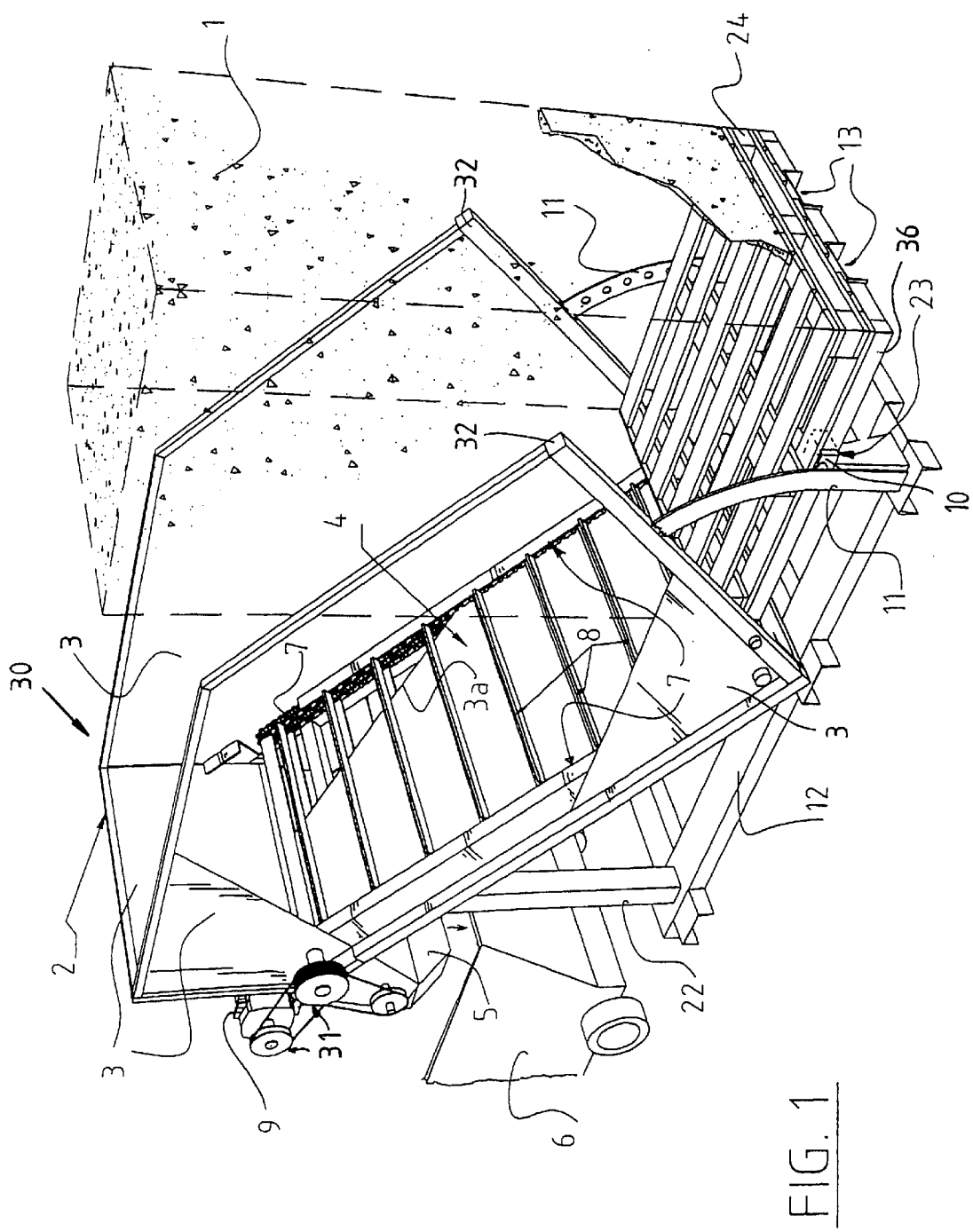
FIG. 1 shows a side perspective view of an embodiment of a device designed according to the present invention shown from the side into which a block of compressed loose material is fed.

FIG. 1 shows a first embodiment of a device 30 designed according to the present invention for loosening a block of compressed loose material 1 (shown in phantom outline), such as for example potting compost. Compressed loose material 1 is shown in the receiving position it occupies prior to being fully received in container 2. The device 30 comprises a container 2 with a plurality of supporting wall members 3, 3a, 3b for receiving the block of compressed loose material 1. Preferably, a first supporting wall member 3a is formed of a plate. A scraper 4 is located closely adjacent to and cooperates with supporting wall member 3a. A discharge opening 5 is located at one end of the container 2 adjacent one end of the scraper 4 and supporting wall member 3a. The supporting wall member 3a supports the compressed loose material 1 when it is in container 2. Supporting wall member 3a is placed at an angle relative to a support frame 12, which is on a horizontal. As a result the discharge opening 5 is elevated relative to the frame 12, so that the device 30 can be coupled to devices know to those skilled in the art such as for example, a pot filling machine 6, another processing device, a conveyor belt or the like. In a preferred embodiment the discharge opening 5 is formed in a funnel shape and is located below the first supporting wall member 3a.

The scraper 4 is formed by two chains 7, each arranged at a longitudinal side of supporting wall member 3a, and by scraping elements 8 attached to the chains 7. The chains 7 are driven around supporting wall member 3a by a motor 9 with a belt transmission assembly 31, as is known in the art. The scraping elements 8 consist of L-shaped strips that are moved over plate-like supporting wall member 3a, which is situated directly below the scraping elements 8 to help retain the scraped off loose material, in the direction of the discharge opening 5.

Supporting wall member 3b, which connects to supporting wall member 3a containing the scraper 4, is pivotable about an axis 10 between a receiving position, as shown, and a supporting position. A pair of bent guides 11 each extend from support frame 12 to one of a pair of support beams 32 connected to supporting wall member 3 and are arranged to guide the supporting wall member 3b as it pivots from the receiving position to the support position. A ratchet mechanism 23 is provided between these guides 11 and the supporting wall member 3b. The ratchet mechanism 23 is designed such that the supporting wall member 3b can pivot downwardly freely to deposit compressed loose material 1 onto supporting wall member 3a, but it prevents supporting wall member 3b from pivoting upwardly in the opposite direction.

The device 30 is entirely supported on support frame 12. The support frame 12 is formed by channel-shaped profiles shaped and spaced to receive the forks of a fork-lift truck (not shown) and by two uprights 22 for supporting the elevated end of the device 30. Supporting wall member 3b also includes two channel-shaped recesses 13 shaped to receive the forks of a fork-lift truck.

Figure 2:
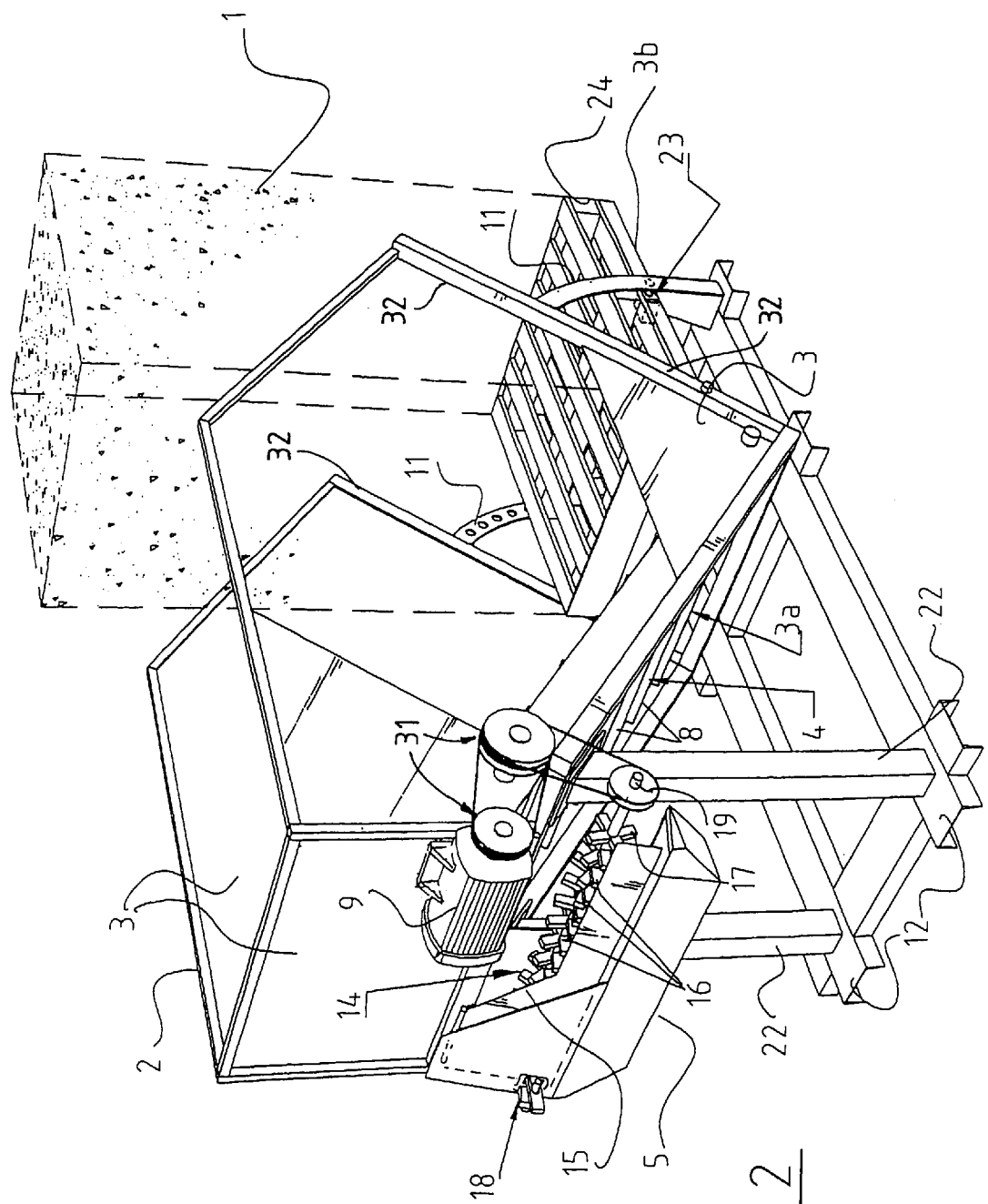
FIG. 2 shows an end perspective view of the device shown in FIG. 1 from an output end of the device.

FIG. 2 shows an end view of the embodiment of FIG. 1 from the end having the discharge opening 5. In the discharge opening 5 a stirring assembly 14 is arranged. The stirring assembly 14 is formed by a plurality of stationary pins 16, arranged on a tiltable plate 15, which cooperate with a plurality of rotating stars 17. The angle of the tiltable plate 15 relative to a horizontal can be adjusted with an adjustment mechanism 18. The pins 16 are arranged in the direction of the stars 17 on an axis of rotation 19, which is also rotated by the motor 9 through belt transmission assembly 31. Although shown at an angle relative to the horizontal, first supporting wall member 3a can also be designed to be parallel to the horizontal.

The device 30 is used in the following manner. First of all the supporting wall member 3b is swivelled downwards to a receiving position, after which with the help of a fork-lift truck the block of compressed loose material 1, which is located on a pallet 24, is placed on the supporting wall member 3b. Subsequently, the forks of the fork-lift truck are inserted into the channel-shaped recesses 13 of the wall member 3b and lifted to pivot the supporting wall member 3b with the compressed loose material 1 supported on it into the container 2 to a supporting position. The motor 9 is switched on and the loosening commences. The L-shaped scraping elements 8 are moved over the supporting wall member 3a by the chains 7 and the scraping elements 8 scrape off material from the side of the compressed loose material 1, which lies on the supporting wall member 3a. The scraping elements 8 simultaneously convey the scraped-off material to the discharge opening 5. The stirring assembly 14, arranged in the discharge opening 5, further breaks up the loose material after which the loose material once more can be further processed, for instance in a flower pot filling machine 6. The weight of the compressed loose material 1 serves to feed the material to the scraper 4 and keeps it in constant contact with the scraper 4. Additionally the compressed loose material's 1 own weight will exert a force on the scraper 4, which ensures good scraping activity.

Figure 3:
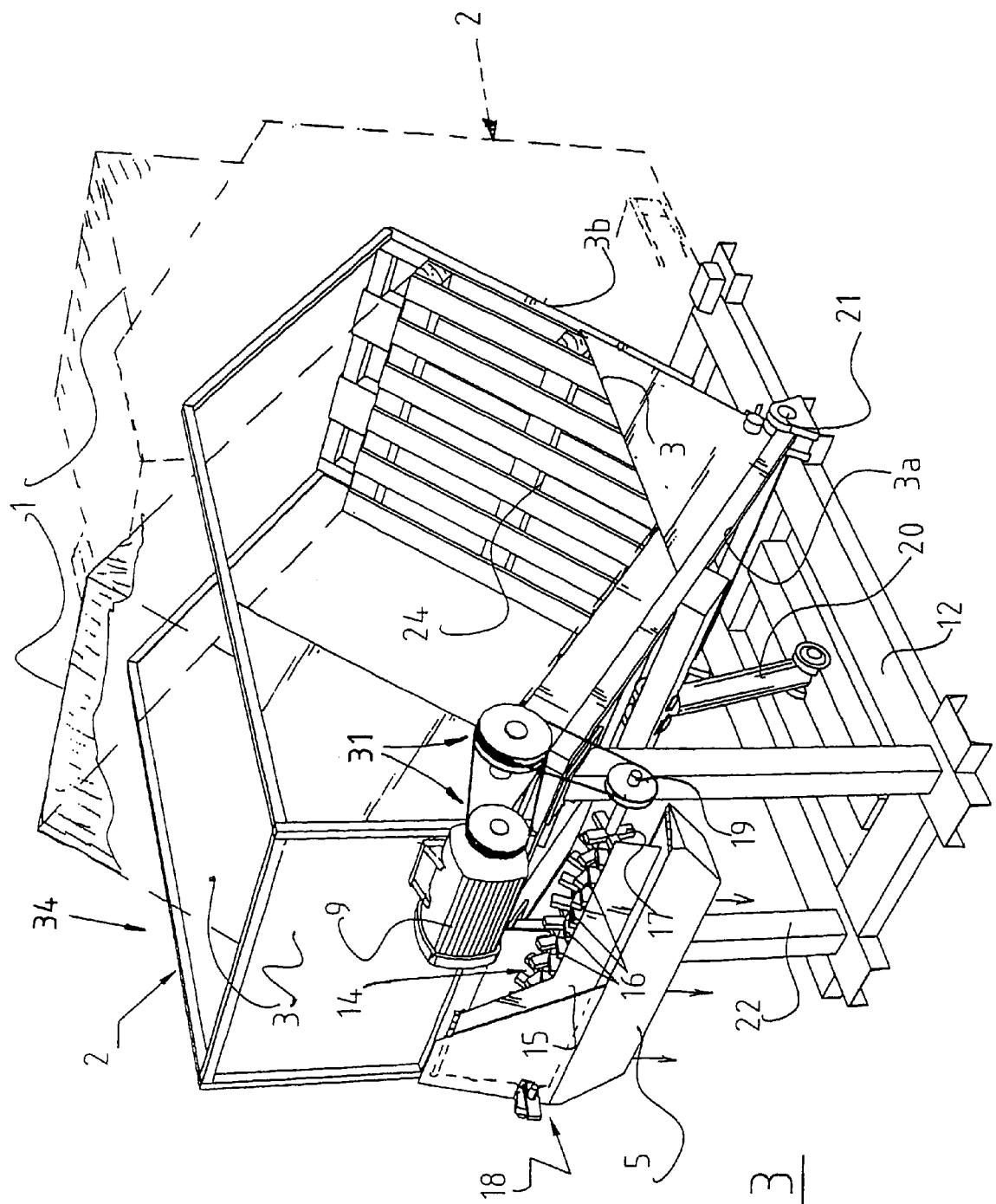
FIG. 3 shows a perspective view of another embodiment of a device designed according to the present invention.

In FIG. 3 an alternative embodiment of a device 34 designed according to the present invention is shown. Common features between device 34 and device 30 are given common reference numbers. In this embodiment the angle of the first supporting wall member 3a relative to frame 12 can be adjusted. The angle of the supporting wall member 3a, and in fact the entire container 2, is adjusted by a cylinder 20, which is arranged between the supporting frame 12 and the container 2. The cylinder 20 may comprise a hydraulic cylinder or other cylinder as is known in the art. For the purpose of the angle adjustment, the container 2 is pivotable about an axis 21 on the supporting frame 12.

The pallet 24 can remain under the compressed loose material 1, so that during the movement itself the loose material 1 need not be handled so much, previous systems had required that the loose material be handled by "pricking" the loose material 1 with the fork-lift truck forks just above the pallet 24.

In the method of using this embodiment, prior to loosening the block of compressed loose material 1 the container 2 is put into an upright receiving position, as shown in phantom, with the help of the cylinder 20. The block of compressed loose material 1 is placed on the supporting wall member 3b in the container 2 with the help of a fork-lift truck (not shown). After that the container 2 is tilted toward the frame 12, as shown in FIG. 3, with the help of cylinder 20 into an inclined scraping position. The angle of incline can be adjusted by the cylinder 20. The angle may be adjusted during scraping to optimize the scraping action. The device 34 is now ready for commencing the loosening of the block of compressed loose material 1 as described above for the first embodiment. The device 30, 34 has utility in loosening compressed loose material of all types such as, for example, potting compost, peat, paper, silage, straw and cotton.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A device for loosening a block of compressed loose material comprising:
 a container for receiving a block of compressed loose material, said container comprising a first supporting wall member adapted for supporting said block of compressed loose material in a stationary position with respect to the first supporting wall;
 a scraper arranged closely adjacent said first supporting wall member, said scraper adapted to scrape a first side of said block of compressed loose material in said container; and
 a discharge opening.

2. A device as recited in claim 1, wherein said scraper is movable about said first supporting wall member in a direction along or in said first supporting wall member.

3. A device as recited in claim 2, further comprising means for keeping a block of compressed loose material stationary with respect to said scraper.

4. A device as recited in claim 2, wherein said first supporting wall member includes said discharge opening located at one end of said first supporting wall member.

5. A device as recited in claim 4, wherein said first supporting wall member is inclined relative to a horizontal and said discharge opening is located at an upper edge of said first supporting wall member.

6. A device as recited in claim 1, wherein said first supporting wall member is angled relative to a horizontal.

7. A device as recited in claim 1, wherein said container is pivotable between an upright receiving position and an inclined scraping position.

8. A device as recited in claim 7, further comprising a cylinder, said cylinder pivoting said container between said upright receiving position and said inclined scraping position.

9. A device as recited in claim 1, wherein another supporting wall member is connected to said first supporting wall member and is pivotable relative to said first supporting wall member between a receiving position and a support position.

10. A device as recited in claim 1, wherein said scraper is formed by an endless belt or chain to which a plurality of scraping elements are attached, said scraper rotatable about said first supporting wall member.

11. A device as recited in claim 10, wherein said scraper elements are shaped as L-shaped strips in cross-section.

12. A device as recited in claim 1, wherein said first supporting wall member comprises a plate placed directly below the scraper, said plate preventing downward flow of scraped off loose material.

13. A device as recited in claim 12, wherein said scraper is movable in a direction along or in said first supporting wall member and wherein said scraper includes a plurality of scraping elements positioned to move closely adjacent to said plate.

14. A device as recited in claim 1, wherein a stirring assembly is arranged in said discharge opening.

15. A device as recited in claim 14, wherein said stirring assembly comprises a plurality of stationary pins arranged on a tiltable plate and a plurality of rotating stars arranged on an axis of rotation, said rotating stars rotated about said axis of rotation.

16. A device as recited in claim 15, further comprising an adjustment mechanism for adjusting the angle of said tiltable plate relative to a horizontal.

17. A method for loosening a block of compressed loose material comprising the following steps:
 a.) supporting a first side of a block of compressed loose material on a first supporting wall member in a container and maintaining said first side stationary against said first supporting wall member;
 b.) locating a scraper between the first side of the block and the first supporting wall member;
 c.) moving the scraper across the first side of the block of compressed loose material to release loose material and convey it to a discharge opening; and
 d.) stirring the released loose material in the discharge opening and collecting the stirred loose material from the discharge opening.

18. A method as recited in claim 17, comprising a further step e.) of supporting a second side, adjacent the first side, of the block of compressed loose material on another supporting wall member.

19. A method as recited in claim 18, wherein steps a.) and e.) further comprise placing the block of loose compressed material on the other supporting wall member to support the second side of the block and then rotating the other supporting wall member toward the first supporting wall member to place the first side of the block onto the first supporting wall member thereby supporting the first side of the block on the first supporting wall member.

20. A method as recited in claim 17, wherein step c.) further comprises rotating the scraper around the first supporting wall member.

21. A method as recited in claim 17, wherein prior to step c.) the first supporting wall member is rotated from an upright receiving position to an inclined scraping position.

22. A method as recited in claim 17, wherein step d.) further comprises passing the loose material through a plurality of rotating star-shaped stirrers.

* * * * *